April 30, 1963  A. WINKLER ETAL  3,087,396
EXPOSURE CONTROLS FOR CAMERAS
Filed May 16, 1961  4 Sheets-Sheet 1

INVENTORS
ALFRED WINKLER
GERD KIPER
BY
Michael S. Striker
Attorney

United States Patent Office 3,087,396
Patented Apr. 30, 1963

3,087,396
EXPOSURE CONTROLS FOR CAMERAS
Alfred Winkler and Gerd Kiper, both of Munich, Germany, assignors to Agfa Aktiengesellschaft, Leverkusen-Bayerwerk, Germany
Filed May 16, 1961, Ser. No. 110,496
Claims priority, application Germany May 27, 1960
17 Claims. (Cl. 95—10)

The present invention relates to cameras.

At the present time there are fully automatic cameras as well as so-called semi-automatic cameras. The fully automatic cameras are of considerable advantage in that they allow exposures to be made quite rapidly without the operator concerning himself with the setting of the camera for a particular exposure time or a particular exposure aperture. However, such fully automatic cameras suffer from the disadvantage of providing no choice as to the combination of exposure time and exposure aperture. Thus, for some subjects it will be desirable to combine the smallest possible exposure aperture with the exposure time, while for other subjects it will be desirable to have the shortest possible exposure time, and such a choice is not available with a fully automatic camera. The semi-automatic cameras do provide such choice, but while they have the advantage of giving a choice of the combination of exposure time and exposure aperture they suffer from the disadvantage of requiring a considerable time to make an exposure. Thus, with such cameras it is necessary for the operator to manually set the exposure time and/or the exposure aperture until a pair of reference elements, one of which may be stationary in the form of a stationary index, for example, are brought into alignment, and these operations do not enable the operator to make rapid exposures.

One of the primary objects of the present invention is to provide a camera which will present the advantages of both of the above-discussed types of cameras. Thus, the camera of the invention is capable of providing on the one hand a choice of combinations of exposure time and exposure aperture and on the other hand the camera of the invention may also be operated in a fully automatic manner so as to provide rapid exposures when desired.

A further object of the present invention is to provide a camera which on the one hand will be operated either as a semi-automatic camera or a fully automatic camera, and which on the other hand provides a wide range of exposure times including a B-setting where the operator can manually determine the exposure time.

Another object of the present invention is to provide a camera of the above type wherein manually operable elements are locked against operation when the camera is set to operate automatically.

It is also an object of the present invention to provide a relatively simple compact structure composed of a relatively small number of elements which are capable of cooperating in a fully reliable manner to produce the above objects.

With the above objects in view the invention includes, in a camera, an exposure time control means and a diaphragm means. A manually operable exposure time setting means is available for manually setting the exposure time control means, and a manually operable diaphragm setting means is available for manually setting the diaphragm means. In addition, an automatic means cooperates with the exposure time control means to set the exposure time automatically and with the diaphragm means to set the diaphragm means automatically. The camera includes a meter which is responsive to the lighting conditions and a pointer means which is moved by the meter to a position which is indicative of the lighting conditions. A manually releasable scanning means is provided for scanning the position of the pointer means, and this scanning means, when released by the operator, will automatically move to a position determined by the pointer means so that the scanning means assumes a position which is also indicative of the lighting conditions. A transmission means is actuated by the scanning means and cooperates with the automatic means to actuate the latter automatically for setting the camera in a fully automatic manner. The camera further includes a reference member and a differential means which is actuated by both of the manually operable means and which cooperates with the reference member for bringing the pointer means and the reference member into alignment during actuation by the operator of either one or both of the manually operable means, so that in this way a so-called semi-automatic operation is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
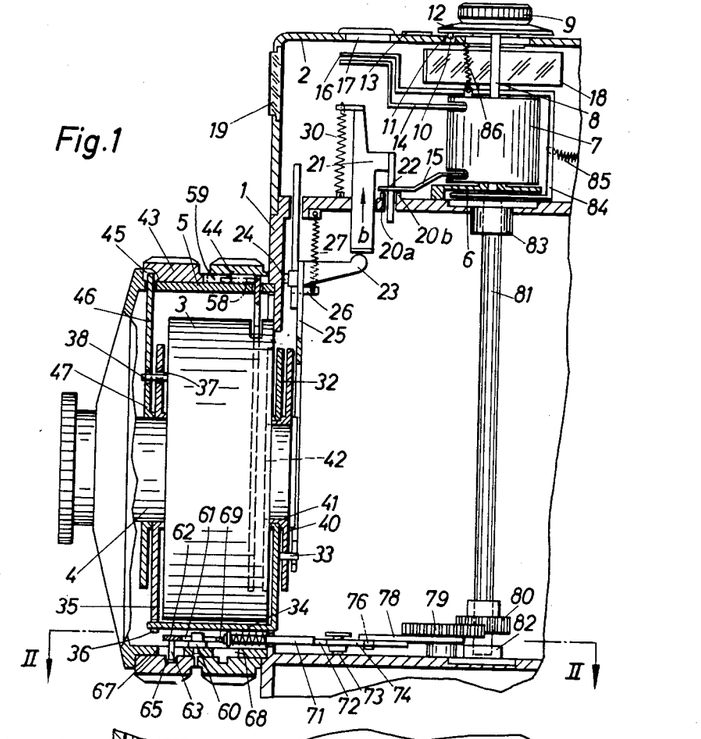
FIG. 1 is a fragmentary sectional elevation of a camera according to the present invention.

Referring to FIG. 1 of the drawings, there is shown therein a camera housing 1 which carries at its upper part a cap member 2 within which is housed various elements such as the viewfinder, the range finder, and the structure for measuring the light intensity. The camera housing carries in a well known way a shutter 3 as well as an inner tube 4 which carries the lenses of the objective, and also the camera housing fixedly carries an exterior tube 5 whose axis coincides with the optical axis.

Within the upper portion of the camera housed by the cap 2 is located a stationary plate 6 which is fixedly carried by the upper wall of the camera housing 1 and which forms a support means supporting a meter 7 for turning movement in its entirety. This meter 7 is an electrical instrument having a rotary coil and may be a galvanometer which in a well known manner is electrically connected with a photoelectric cell or other light-sensitive structure so that the rotor of the electrical instrument 7 will turn to a position indicative of lighting conditions, as is well known in the art. The exterior housing of the meter 7 is fixedly connected with a shaft 8 which is coaxial with the rotor of the meter 7, and the shaft 8 extends through a suitable cutout in the top wall of the cap 2 to the exterior of the camera where the shaft 8 supports a knob 9. The knob 9 connected to the shaft 8 for axial movement with respect thereto but is constrained against rotary movement with respect to the shaft 8. Thus, the knob 9 may carry, for example, a key which extends slidably into an axial groove formed in the shaft 8. At its underside the knob 9 fixedly carries a pin 10 which may be selectively placed by the operator in one of a series of openings 11 formed in the top wall of the cap 2, the openings 11 being arranged along a circle whose center is in the axis of the shaft 8 and of course in the coinciding axis of the meter 7. Thus, by placing the pin 10 in a selected opening 11 the angular position of the shaft 8 and thus of the meter 7 will be determined by the operator. A spring 86 is connected at one end to the meter 7 at the exterior thereof and at its opposite end the spring 86 extends through an opening in the top wall of the cap 2 to the underside of the knob 9 to which the spring 86 is connected, so that the spring 86 urges the knob 9 downwardly in order to maintain the pin 10 in a selected opening 11, the meter 7 being restrained against axial movement by the bearings which support the meter 7 or rotary movement in its entirety. In order to set the knob 9 and thus the shaft 8 and the meter 7 at a selected angular position the knob 9 carries an index 12 which cooperates with a scale 13 arranged at the exterior upper surface of the cap 2, and this scale 13 is a scale of film speeds, so that according to the speed of the film which is placed in the camera the operator will place the knob 9 in a selected angular position and in this way place the meter 7 in an angular position which will introduce into the camera the factor of the speed of the film which is used in the camera. Of course, it is also possible to introduce in this way other factors beside film speed. For example, the particular filter arrangement which is used with the camera may also be set into the camera with the structure so as to influence the exposure accordingly. For this purpose, the knob 9 may carry several indexes 12 which may be differently colored, for example, and which respectively correspond to different filter arrangements, so that in accordance with the particular filter arrangement a selected index 12 will be placed in alignment with the graduation of the scale 13 which corresponds to the speed of the film which is in the camera, and in this way the structure introduces into the camera not only the factor of film speed but also the factor of the filter arrangement.

The unillustrated rotor of the meter 7 is fixed to a pointer means 14, 15 so that the angular position of the pointer means is determined by the meter 7, and thus the angular position of the pointer means will be indicative of the lighting conditions. The pointer means 14, 15 includes a stepped pointer member 14 which is stepped upwardly from the meter 7, as viewed in FIG. 1, and a stepped pointer 15 which is stepped downwardly in the manner shown in FIG. 1. The camera includes a reference member which is available for being brought into alignment with the pointer 14 of the pointer means, and this reference member takes the form of a pointer 16 which is stepped similarly to the pointer 14, as shown in FIG. 1. At its front wall the cap 2 is provided with a window 19 through which light reaches the pointer 13 as well as the reference member 16, and with this illumination the alignment of elements 14 and 16 may be observed by the operator through the window 17 at the top of the cap 2, or a reflector 18 is carried within the space in the interior of the cap 2 for reflecting into the viewfinder an image of the elements 14 and 16 so that the operator, while looking at the subject through the viewfinder, will also see images of elements 14 and 16 and may bring the pointer means and reference member into alignment while observing the subject through the viewfinder. The structure for receiving the images from the reflector 18 and providing in the field of the viewfinder an image of the elements 14 and 16 is well known.

The lower pointer 15 of the pointer means 14, 15 is capable of sweeping freely over a pair of stationary bearing elements 20a and 20b. The camera includes a manually releasable scanning means capable of scanning the position of the pointer means 14, 15, and this scanning means includes the scanning member 21 provided with an edge 22 which is directed downwardly toward the pointer 15 and which has a curvature which, in the well known way, will control the elevation of the scanning means 21 when the edge 22 thereof engages the pointer 15, so that in this way the elevation of the scanning means 21 will also be indicative of the lighting conditions. When the edge 22 engages the pointer 15 the latter in turn engages the edges 20a and 20b, so that these edges 20a and 20b form a support for the pointer 15 during the scanning thereof by the scanning means 21. The curvature of the edge 22 is such that the extent of movement of the scanning means 21 from its rest position is proportional to the angular position of the pointer 15 so that in this way it is possible to transmit through the scanning means 21 the light intensity.

It will be noted that the upper wall of the camera housing 1 is formed with suitable openings through which the scanning means 21 is freely movable in a vertical direction, and of course these openings guide the scanning means 21 for vertical movement, the portion of the scanning means 21 which is provided with the scanning edge 22 extending between the edges 20a and 20b and through a slot formed in the top wall of the housing 1 between these edges 20a and 20b.

Figure 3:
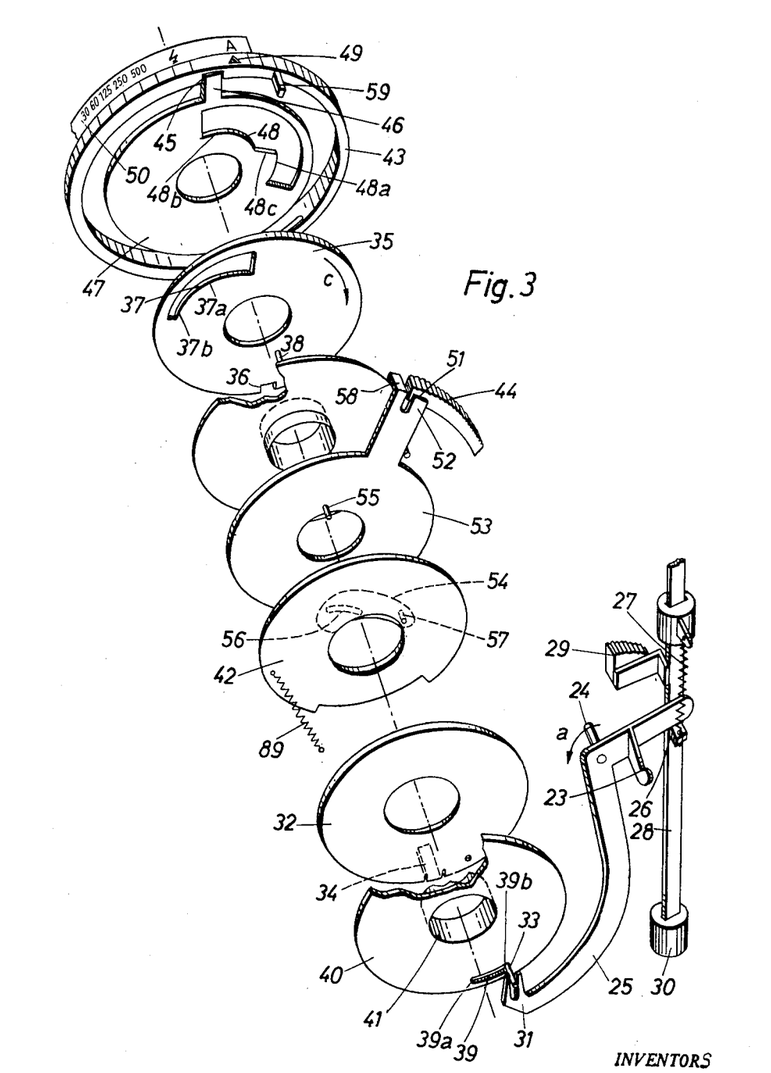
FIG. 3 is an exploded perspective illustration of the elements which are arranged along the optical axis for setting the exposure time and the exposure aperture either manually or automatically.

At its underside the scanning means 21 is engaged by a lug 23 which is fixed to and extends from a lever 25 and which forms with the lever 25 a transmission means for transmitting movement of the scanning means to an automatic means, described below, which automatically sets the camera. This lever 25 is supported intermediate its ends for turning movement by a stationary pivot pin 24 which is fixedly carried by the camera housing 1 and which extends parallel to the optical axis (FIGS. 1 and 3). The arm of the lever 25 which carries the lug 23 extends over and engages a lug 26 which is fixed to and extends from a release rod 28 which is guided for vertical movement by suitable stationary bearings, as illustrated in FIG. 3. The upper one of these bearings is fixed to a spring 27 the bottom end of which is connected to the lug 26, so that the spring 27 urges the rod 28 upwardly, and thus the rod 28 through its slot 26 acts on the two-armed lever 25 to urge the latter to turn in the direction of the arrow a shown in FIG. 3. The release rod 28 fixedly carries a manually-engageable key 29 located at the exterior of the camera and fixed to the rod 28 through an extension which passes through a suitable slot formed in a wall of the camera housing 1, and in this way the operator has free access to the key 29 at the front of the camera. The return spring 27 by urging the lever 25 to turn in the direction of the arrow a of FIG. 3 causes the lug 23 of the lever 25 to act on the scanning means 21 to urge the latter in the direction of the arrow b (FIG. 1). In this way the spring 27 maintains the manually-releasable scanning means 21 in its rest position where the scanning edge 22 is displaced upwardly from the pointer 15 so that the latter is free to move along the edges 20a and 20b. The key 29 of the manually-releasable scanning means enables the operator to move the release rod 28 downwardly in opposition to the spring 27. At this time a drive spring 30 which is weaker than the spring 27 and which is connected at one end to the top wall of the housing 1 and at its opposite end to the scanning means 21, as shown in FIG. 1, can move the scanning means 21 downwardly, in a direction opposite to that indicated by the arrow b of FIG. 1, so that the scanning means 21 will now actuate the transmission means 25 to turn the latter in a direction opposite to that indicated by the arrow a of FIG. 3. In this way the edge 22 of the scanning means will on the one hand scan the position of the pointer 15 so as to determine the elevation of the scanning means 21 and on the other hand the transmission 23, 25 will transmit the movement of the scanning means to structure which will automatically set the exposure time and exposure aperture of the camera in a manner described below.

The automatic means for automatically setting the camera includes a rotary ring 32 (FIGS. 1 and 3) which is coaxial with the objective and which is supported for rotary movement about the optical axis. The ring 32 fixedly carries a pin 33 which extends parallel to the optical axis and which is received in a bifurcated portion 31 at the end of the lever 25, this bifurcated portion 31 and the pin 33 forming a lost-motion connection in the nature of a pin-and-slot between the transmission means 23, 25 and the automatic means which includes the rotary ring 32. This ring 32 of the automatic means surrounds the lens tube 4 and fixedly carries an elongated projection 34 which extends forwardly from the ring 32 parallel to the optical axis, this projection 34 being received in a notch 36 which is formed in a ring 35 which is coaxial with the ring 32 and which also is supported for rotary movement about the optical axis. This ring 35 forms that part of the automatic means of the embodiment of FIGS. 1 and 3 which automatically sets the exposure time control means which determines the exposure time, and for this purpose the ring 35 is formed with an elongated cutout having a camming edge 37 which determines the position of the pin 38 which forms part of the exposure time control means, this exposure time control means including in addition to the pin 38 structure for retarding the operation of the shutter in a controlled manner so as to provide predetermined exposure times according to the position of the pin 38, as is well known in the art. The pin 38 of course is maintained in engagement with the camming edge 37 of the ring 35 which turns with the ring 32.

The pin 33 of the automatic means passes through an arcuate slot 39 formed in a ring 40 which is coaxial with the ring 32 and which is also turnable about the optical axis, this ring 40 forming that part of the automatic means of FIGS. 1 and 3 which participates in the automatic setting of the diaphragm of the camera. The ring 40 is provided at its center with a tubular projection 41 which directly surrounds and engages the stationary lens tube 4, and it will be noted that it is this tubular projection 41 which directly engages the ring 32 to support the latter for rotary movement. The tubular projection 41 is fixed at its front end to a rotary diaphragm-setting ring 42 which also is coaxial with the other rings and supported for rotary movement. The angular length of the slot 39, which extends along a circle whose center is in the optical axis, equals the angular distance through which the rings 32 and 35 turn during changing of the exposure time between its end values, so that while the pin 33 moves along the slot 39 the exposure time will be set but the diaphragm will remain unchanged. The friction between the tubular projection 41 of the ring 40 and the tube 4 may be sufficiently great to maintain the assembly 40—42 stationary during turning of the rings 32 and 35, or, as shown in FIG. 3, a spring 89 may be connected at one end to the ring 42 and at its opposite end to a stationary part of the camera to urge the rings 40 and 42 of the automatic means to a predetermined rest position where the diaphragm is at its maximum opening, for example. Thus, it will be seen that the spring 89 urges the rings 40, 42 to turn in a direction opposite to that indicated by the arrow $c$ which is shown in FIG. 3 on the ring 35.

The structure includes, in addition to the above-described automatic means capable of automatically setting the exposure time and exposure aperture in a manner described below, manually operable structure for manually setting the exposure time and/or the exposure aperture, and this manually operable structure includes a pair of setting rings 43 and 44 surrounding and turnably carried by the tube 5. The setting ring 43 carries (FIG. 3) an index 49 cooperating with a scale 50 which is carried by the tube 5 at the exterior thereof, and this scale 50 includes a symbol "A" which indicates the setting of the camera for automatic exposure control. The scale further includes a symbol similar to that which indicates lightening (shown to the left of the symbol "A" in FIG. 3), and this latter symbol indicates the position of the index 49 for making flash exposures, and finally to the left of the flash symbol is located a scale of exposure time values with a selected one of which the index 49 may be aligned by the operator to introduce manually into the camera a selected exposure time when the camera is operated as a semi-automatic camera.

At its inner surface the ring 43 is formed with a recess 45 which receives an end of a radial projection 46 of a ring 47 which is supported by the tube 4 for movement about the optical axis and which forms part of the manually operable means for setting the exposure time control means 38. This ring 47 is formed with a cutout having a camming edge 48 which also cooperates with the pin 38 for setting the exposure time, this pin 38 extending through the cutout provided with the camming edge 37 into engagement with the edge 48. Thus, the rings 43 and 47 form a manually operable means for manually setting the exposure control means so as to determine the exposure time in a manual manner.

The pair of camming edges 37 and 48 are arranged with respect to each other in such a way that the camming edge 37 is operative when the ring 35 turns in the direction of the arrow $c$ shown in FIG. 3. For this purpose the camming edge 37 has a pair of portions 37$a$ and 37$b$, the camming edge portion 37$a$ leading the portion 37$b$ in the direction of the arrow $c$. The portion 37$a$ is formed so that a range of adjustment of the pin 38 from one end position to the opposite end position takes place solely during engagement of the portion 37$a$ with the pin 38, while the portion 37$b$ extends along an arc of a circle whose center is in the optical axis so that while the pin 38 engages the portion 37$b$ of the camming edge 37 no further setting of the exposure time control means 38 will take place. At this time the exposure time control means will remain in the position which it has moved as a result of cooperation of the camming edge portion 37$a$ with the pin 38.

In a similar way the camming edge 48 of the ring 47 has a pair of portions 48$a$ and 48$b$, and the portion 48$a$ is the active or operative portion of the camming edge 48 while the portion 48$b$ is the inactive or inoperative edge portion. Thus, while the pin 38 is engaged by the portion 48$b$, which extends along an arc of a circle whose center is in the optical axis, there will be no change in the exposure time, while when the portion 48$a$ of the camming edge 48 engages the pin 38 and turns about the optical axis there will be a change in the exposure time. The arrangement is such that when the ring 47 is manually turned in a direction opposite to that indicated by the arrow $c$ the inactive camming edge portion 48$b$ will move along the pin 38 which will thus remain stationary at this time. Then an intermediate portion 48$c$ of the camming edge 48 will engage the pin 38 and will provide the shortest exposure time, and finally the active camming edge portion 48$a$ will come into engagement with the pin 38 so as to provide progressively longer exposure times. The arrangement of the camming edge portion 48$c$ is such that it moves the exposure time control pin 38 between the position which provides a proper exposure during flash operation and the position of shortest exposure time such as $\frac{1}{500}$ sec., for example. The length of the inactive portion 48$b$ of the camming edge 48 is at least double the angular distance through which the ring 42 or the ring 53 (described below) must be turned in order to set the diaphragm between its minimum and maximum apertures.

The manually operable diaphragm setting means includes the ring 44 supported for rotary movement by the tube 5 and provided at its inner surface with a recess 51 receiving an end of a radial projection 52 of a second diaphragm-setting ring 53. The ring 53 fixedly carries a pin 55 for each blade 54 of the diaphragm means. Of course, a plurality of overlapping blades 54 form the diaphragm means, but only a single blade 54 is shown in FIG. 3 for the sake of clarity. The pin 55 which is fixed to the ring 53 of the manually operable means extends into an elongated slot 56 formed in the blade 54 of the diaphragm means, and in this way the manually operable means 44, 53 cooperates with the diaphragm means 54. Each blade 54 is in addition pivotally connected with the ring 42 by a pivot pin 57 fixed to the ring 42 and extending through a suitable opening of the blade 54, as shown in FIG. 3. Thus, when the ring 53 turns with respect to the ring 42 the several pins 55 will respectively cooperate with the several slots 56 to turn the blades 54 with respect to the pivots 57, respectively, while when the ring 42 turns with respect to the ring 53 the blades 54 will be shifted so as to move the slots 56 respectively along the pins 55, which are now stationary, and in this way the blades 54 will also turn about the pins 57, which simultaneously turn with the ring 42, so as to set the diaphragm. The radial extension 52 is provided with an axial portion 58 which cooperates with an axially extending projection 59 fixed to the ring 43. The automatic means which includes the ring 42 remains stationary during manual setting of the rings 43 and 44, so that the angular position of the ring 42 is predetermined at this time. When the camera is set for automatic operation the operator turns the ring 43 in the direction of the arrow c of FIG. 3 so as to bring the index 49 into alignment with the symbol "A," and during this turning the projection 59 will engage the projection 58 to turn the ring 53 as well as the ring 44 in a clockwise direction, as viewed in FIG. 3, so that the several pins 55 move respectively along the slots 56 to bring the diaphragm means 54 in the example illustrated in FIG. 3 to its fully open position providing largest aperture when the structure is set for automatic operation, and it will be noted that this control of the diaphragm means takes place fully automatically when the operator manually turns the ring 43 of the manually operable exposure time setting means which in the manner described above additionally serves the function of setting the camera for fully automatic operation.

Figure 2:
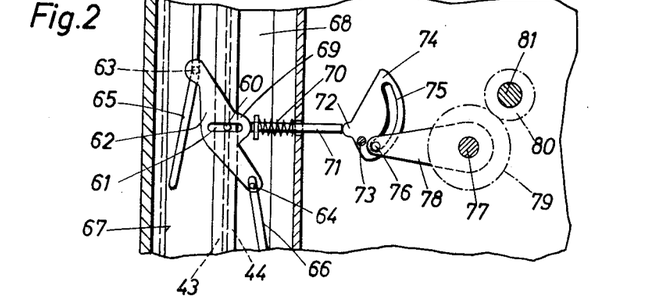
FIG. 2 is a fragmentary plan view taken along line II—II of FIG. 1 in the direction of the arrows.

As may be seen from FIGS. 1 and 2, the tube 5 fixedly carries at its inner periphery a pin 60 which extends through an elongated slot 61 formed in a two-armed lever 62. The arms of the lever 62 respectively carry pins 63 and 64. The pin 63 extends through an opening 67 which is formed in the outer tube 5 and into an elongated camming groove 65 which is formed at the inner periphery of the manually operable exposure time setting means or ring 43. The pin 64 extends through an opening 68 of the outer tube 5 into a corresponding elongated camming groove 66 which is formed at the inner periphery of the manually operable diaphragm setting means or ring 44. The lever 62 has a cam-shaped projection 69 which engages one end of an axially movable pin 71. A spring 70 is coiled about the pin 71, engages at its right end, as viewed in FIGS. 1 and 2, a stationary part of the camera structure, and engages at its left end a collar which is fixed to the pin 71, so that the springs 70 urges the pin 71 to the left, as viewed in FIGS. 1 and 2, and thus maintains the left end of the pin 71 in engagement with the projecting portion 69 of the lever 62.

The end of the axially shiftable pin 71 which is distant from the lever 62 engages a camming portion 72 of a plate 74 which is supported for turning movement by the stationary pin 73 which is carried by a stationary part of the camera. The plate 74 is formed with an arcuate slot 75 which forms a compensating cam which in a known way compensates the movement characteristics of the adjusting or setting rings 43 and 44, on the one hand with the operating characteristics of the meter 7. In other words, as is well known, the meter 7 will not have a straight line characteristic and the curvature of the slot 75 compensates between the operation of the meter 7 and the adjustments made with the rings 43 and 44. The camming slot 75 receives a pin 76 which is fixed to a lever 78 which is turnable about the stationary pivot pin 77 which is fixedly carried by the camera so that the axial movement of the pin 71 will result in turning of the plate 74 which through the cammining slot 75 will act on the pin 76 so as to turn the lever 78, and this lever 78 is fixed with a gear 79 also supported for rotary movement by the pin 77. The gear 79 meshes with a pinion 80 which is fixed to the lower end of an elongated shaft 81 supported for rotary movement by bearings 82 and 83 which are fixedly carried by stationary parts of the camera. The axis of the shaft 81 coincides with the axis of the meter 7 and of course with the axis of the shaft 8 which is fixed to the housing of the meter 7, as described above. An elongated member 84 of substantially U-shaped configuration is fixed at its lower end to the top end of the shaft 81 and extends around the meter 7 to the upper part thereof where the member 84 is fixed to the reference member or pointer 16. A spring 85 is fixed at one end to a stationary part of the camera and at its opposite end to the member 84 so as to urge the latter together with the reference member 16 and the shaft 81 to turn in a direction which will cause the shaft 81 through the gearing 79, 80 and the lever 78 to act through the pin 76 and the slot 75 on the plate 74 for maintaining the projection 72 thereof in engagement with the right end of the pin 71. The camming grooves 65 and 66 together with the pins 63 and 64 and the lever 62 as well as the entire transmission formed by the pin 71, the plate 74, the lever 78, the gearing 79, 80, the shaft 81, and the element 84 form a differential means which connects the rings 43 and 44 to the reference member 16 so that the latter will be moved upon operation of either the ring 43 or the ring 44 in such a way that when the operator turns these rings to set the camera the reference member 16 will be moved and can be brought by the operator into alignment with the pointer 14 of the meter 7. This alignment of the elements 14 and 16 can be observed through the window 17 or in the viewfinder as the result of projection into the viewfinder of the images of elements 14 and 16 by the reflector 18 as described above. Thus, when the camera is used as a semi-automatic camera the operator will turn the ring 43 and/or the ring 44 until the reference member 16 and the pointer 14 are brought into alignment, and then the operator will know that the camera is set to make a proper exposure.

In order to operate the camera automatically, the operator turns the ring 43 so as to bring the index 49 into alignment with the symbol "A" of the scale 50. Then the operator depresses the key 29 so as to release the scanning means 21 which is urged downwardly by the spring 30 until the scanning edge 22 engages the pointer 15, and this will result in turning of the lever 25 of the transmission between the scanning means and the automatic means so that in this way the lever 25 turns until the scanning edge 22 engages the pointer 15 and presses it against the surfaces 20a and 20b. The lever 25 acts on the pin 33 so as to turn the ring 32 which as a result of this coupling by way of the extension 34 with the ring 35 turns the latter ring so as to move the camming edge 37 with respect to the exposure time control pin 38, and in this way while the pin 38 is engaged by the portion 37a of the camming edge 37 the exposure time will be set.

In the particular example illustrated the exposure time is adjusted while the diaphragm means 54 remains in its fully open position, as described above. Assuming that the amount of light is so great that when the exposure time has been reduced by the camming edge portion 37a to its minimum value it is still necessary to decrease the amount of light, then the continued turning of the pin 33 will cause the pin 33 to engage the end 39a of the slot 39 and the ring 40 will now start to turn. At this time the pin 38 is engaged by the portion 37b of the camming edge 37 so that the exposure time remains unchanged at its minimum value and now the turning of the ring 40 together with the ring 42 will result in movement of the slots 56 of the diaphragm blades 54 with respect to the pins 55 so that the size of the exposure aperture now is constantly reduced as long as the lever 25 continues to turn. Of course, during this automatic operation the ring 53 together with the manually turnable ring 44 remains stationary. In this way the camera will operate to reduce first the exposure time and then the exposure aperture until the scanning edge 22 engages the pointer 15, and the structure will automatically stop at a combination of exposure time and exposure aperture which will give a proper exposure. This operation is carried out in a fully automatic manner in an extremely short time, and then in order to make an exposure the operator will simply actuate a conventional shutter release.

When the operator releases the key 29 this key together with the rod 28 are returned to their starting position by the return spring 27 and the projection 26 will engage the lever 25 at this time to turn it in the direction of the arrow *a* shown in FIG. 3, so that the scanning means 21 is now moved in a direction of the arrow *b* by engagement of the lug 23 of the lever 25 with the underside of the scanning means 21, and this movement of course takes place in opposition to the spring 30. The upward movement of the scanning means of course displaces the scanning edge 22 upwardly from the pointer 15 which is now freed to turn with respect to the surfaces 20a and 20b. This return movement of the lever 25 of course results in return of the rings 32 and 35 to their starting position and when the pin 33 engages the end 39b of the slot 39 the rings 40 and 42 also return to their starting position. Of course, where a spring 89 is provided, as shown in FIG. 3, the rings 40 and 42 will be returned by the spring 89 to their starting position as soon as the lever 25 starts to return to its starting position, and then when the rings 40 and 42 have reached their starting position the pin 33 will continue to move along the slot 39 to the end 39b thereof which is the starting position of the entire automatic assembly.

In order to make a flash exposure the manually operable exposure time setting means 43 which also acts as a means for selecting the particular type of operation is turned until its index 49 is aligned with the symbol on the scale 50 which indicates the setting for flash operation. This turning of the ring 43 will of course also in turning of the ring 47 so that the inactive portion 48b of the camming edge 48 moves along the pin 38. The projection 50 of the ring 43 is turned at this time in a direction opposite to that indicated by arrow *c* through a distance which permits turning of the ring 53 by the operator through an angle great enough to provide the entire range of possible adjustments of the diaphragm without engagement between the projection 58 and the projection 59. If it is assumed that in the illustrated example the exposure times may be adjusted between 1/30 sec. and 1/250 sec., and that the exposure time for flash operation is 1/30 sec., then the camming edge 48 will have the configuration shown in FIG. 3. In the event that it is desired with the same shutter to make flash exposures with an exposure time of 1/60 sec., then at the end of the inactive camming edge portion 48b just before the beginning of the active portion 48a there is a cam-shaped projection which, when the rings 43 and 47 are in the angular position for flash operation engages the pin 38 and turns it to a position which will provide an exposure time of 1/60 sec.

In order to adjust the size of the exposure aperture the manually operable diaphragm setting means 44 is turned in a direction opposite to that engaged by the arrow *c*. Because of the coupling between the ring 44 and the ring 53 by way of the projection 52 of the ring 53, this ring 53 turns with the ring 44. Since at this time the rings 40 and 42 are stationary, the pivots 57 of the blades 54 are also stationary, and thus the pins 55 which turns with the ring 53 move along the slots 56 so as to turn the blades of the diaphragm means and thus adjust the size of the exposure aperture.

In order to use the camera in a semi-automatic manner, the ring 43 is manually turned until the index 49 is aligned with the desired exposure time on the scale 50. This turning of the ring 43 will cause the camming slot 65 to act on the pin 63 so as to actuate the differential lever 62 for shifting the pin 71. It will be noted that the camming groove 65 extends along a helical path only at a region where this helical part of the groove engages the pin 63 when the index 49 is aligned with a particular exposure time of the scale 50. In other words the location of the helical portion of the camming groove 65 is such that the helical portion will engage the pin 63 only when the ring 43 is turned to a position which provides semi-automatic operation, which is to say when the index 49 is aligned with a selected value of exposure time. Otherwise the pin 63 is located in a circular portion of the groove 65 and of course at this time there will be no movement of the lever 62. Of course, this movement of the pin 71 of the differential means will act through the plate 74 and the lever 78 on the gearing 79 and 80 on the shaft 81 to turn the latter together with the element 84 and the reference member 16. After the operator has chosen a particular exposure time, assuming that during semi-automatic operation the operator starts off by choosing a given exposure time, the operator will turn the ring 44 until the reference pointer 16 is brought into alignment with the pointer 14, and then the camera is properly set to make an exposure. Of course, the turning of the ring 44 will cause the camming groove 66 to act on the differential lever 62 so as to turn the reference member 16.

In order to change back to automatic operation it is only necessary for the operator to turn the ring 43 in the direction of the arrow *c* of FIG. 3 until the index 49 is again aligned with the symbol "A." This will result in the projection 59 engaging the projection 58 so as to turn the rings 44 and 53 automatically to a position where the diaphragm is properly set to initiate the automatic operation.

Figures 4, 5:
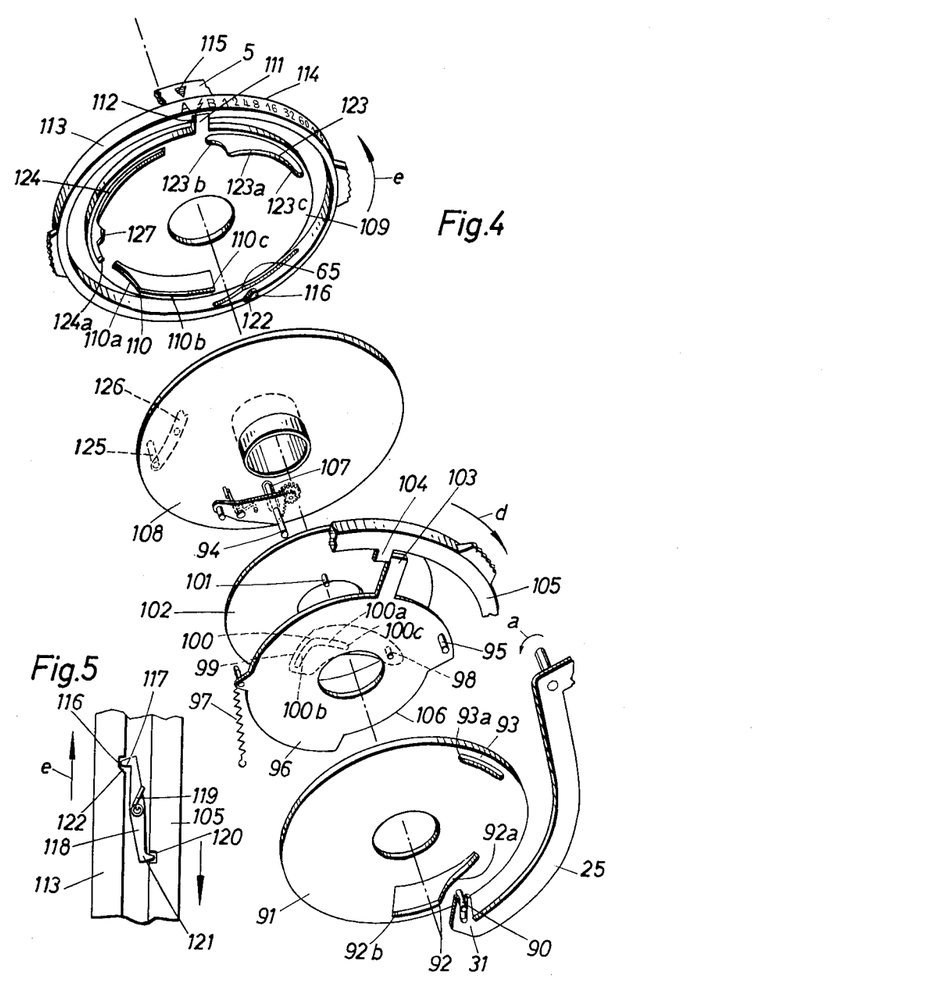
FIG. 4 is an exploded perspective illustration of another embodiment of an assembly for providing a semi-automatic or fully automatic camera.
FIG. 5 is a fragmentary illustration of a releasable lock means which maintains a manually operable element against operation when the camera is set to operate automatically.

In the embodiment of the invention which is illustrated in FIG. 4, the meter and pointer means as well as the scanning means, the transmission between the scanning means and the automatic means, and also the pair of manually operable rings and the differential means which actuate the reference member 16 are all identical with that described above in connection with FIGS. 1–3. In the embodiment of FIG. 4 the bifurcated portion 31 of the transmission lever 25 engages a pin 90 of an automatic means which is constructed differently from that of FIGS. 1–3. The pin 90 is fixed to a ring 91 which is supported for rotary movement about the optical axis, and this ring 91 itself is formed with a cutout having a camming edge 92 which actuates the exposure time control means of this embodiment. The ring 91 is also formed with an arcuate slot 93 which extends along a circle whose center is in the optical axis. The camming edge 92 cooperates with the pin 94 of the exposure time control means which is in the form of a well known retarding mechanism for retarding the operation of the shutter according to the position of the pin 94, this pin 94 of course extending into the cutout of the plate 91 and being urged by a spring at all times into engagement with the camming edge 92. The camming edge 92 has an active portion 92a which will change the exposure time during movement of the camming edge portion 92a with respect to the pin 94, and the camming 92 has an inactive portion 92b which extends along an arc of a circle whose center is in the optical axis and which when it moves with respect to the pin 94 will not change the position thereof. The slot 93 of the ring 91 receives a pin 95 which is fixed to a diaphragm ring 96 which fixedly carries the pivot pins 98 of the several blades 99 which form the diaphragm means of this embodiment. A spring 97 is connected at one end to a stationary part of the camera and at its opposite end to the ring 96 so as to yieldably urge the latter to a predetermined starting position. In this starting position the pin 95 of the ring 96 is located at the end 93a of the slot 93. The length of the slot 93 is equal to the angular distance through which the ring 96 must turn in order to provide a full range of adjustment of the diaphragm from its largest to its smallest size. For the sake of clarity only one pivot pin 98 and one diaphragm blade 99 are shown. The several blades 99 are formed with control slots 100, and these slots respectively receive pins 101 which are fixed to a stationary ring 102 fixedly carried by a stationary part of the camera. The several control slots 100 of the blades 99 each have a pair of portions 100a and 100b, and the portion 100a of each slot 100 is an active portion providing a change in the size of the diaphragm during movement of the portion 100a and the slot 100 along the pin 101, while when the portion 100b of the slot 100 moves along the pin 101 there is no change in the size of the exposure aperture, so that the portion 100b of each slot 100 is an inactive camming portion. The ring 96 fixedly carries a radial projection 103 which is urged by the spring 97 into engagement with an inner projection 104 of the ring 105 which corresponds to the ring 44 described above and which forms together with the ring 96 in the embodiment of FIG. 4 the structure for manually setting the diaphragm. The side of the projection 104 which is directed away from the projection 103 engages an unillustrated stationary stop member which thus limits the turning of the ring 105 in a direction opposite to that indicated by the arrow d, and thus the spring 97 will, by urging the projection 103 into engagement with the projection 104 when the latter engages the stop member, locate the diaphragm at a proper starting position which in the illustrated example is the fully open position. The stationary ring 102 as well as the turnable ring 96 are formed with arcuate notches 106 at their peripheries through which the pin 94 passes into the cutout which is provided with the camming edge 92, so that the diaphragm operating structure does not in any way interfere with the exposure time control means.

At its end which is directed away from the ring 91, the pin 94 extends through a slot 107 of a stationary plate 108 which also carries the additional unillustrated parts of the shutter, and the pin 94 at its forward end portion extends into another cutout into engagement with the second exposure time controlling camming edge 110. This latter cutout and the camming edge 110 are carried by a ring 109 which, in the same way as the ring 47 of FIG. 3, has a radial projection 111 received in a recess 112 formed at the inner surface of the manually turnable exposure time setting ring 113 of the embodiment of FIG. 4. In this embodiment the ring 113 carries the scale 114 which is provided with the symbol "A" for automatic operation, with a symbol for flash operation, with a "B" setting for manual determination of exposure time, as well as with a series of exposure time graduations which are used during semi-automatic operation of the camera. This scale 114 cooperates with a stationary index 115 carried by the stationary outer tube 5. The manually turnable ring 105 which forms part of the manually operable means for setting the diaphragm cooperates with a similar scale of stop numbers which indicate the sizes of the exposure apertures for semi-automatic operation of the camera. The ring 113 is formed at its inner periphery with a camming groove 65 which actuates the differential means which is identical with that described above, and in the same way the ring 105 is formed at its inner periphery with a camming groove 64.

The ring 113 is also formed with a notch 116 (FIGS. 4 and 5) in a flange of the ring 113 which is directed toward the ring 105, and a projection 117 at the end of a lever 118 is received in the notch 116 when the ring 113 is set for automatic operation. This projection 117 forms an end portion of a two-armed lever 118 which is supported between the rings 105 and 113 for turning movement and which is urged by a spring 119 to turn in a counterclockwise direction, as viewed in FIG. 5. The ring 105 is formed at a flange portion which is directed toward the ring 113 with a notch 120 which receives the opposite end portion 121 of the lever 118, this opposite end portion 121 also being in the form of a projection. When the parts are in the position shown in FIG. 5, and this is the position which the rings 113 and 105 take during automatic operation of the camera, turning of the ring 105 is not possible because of the configuration of the notch 120 and the projection 121 located therein. On the other hand, it is possible to turn the ring 113 in the direction of the arrow e, since this will result in engagement of the inclined edge 122 of the notch 116 with the projection 117 so that the lever 118 will in this way be turned in opposition to the spring 119, and of course this turning will result in movement of the projection 121 out of the notch 120 so that the ring 105 is also released. Thus, the lever 118 forms a releasable lock means capable of releasably locking the ring 105 as well as the remainder of the manually operable diaphragm setting means in a predetermined position for automatic operation, and the manually operable exposure time setting means which is formed in part by the ring 113 is capable of releasing the lock means so as to release the ring 105 when this manually operable exposure time setting means is turned to a position other than that required for automatic camera operation. Thus, with the embodiment of FIG. 4 when the camera is to be used for automatic operation the ring 105 is turned to a position which provides an end value of the exposure aperture such as the largest possible opening thereof, as shown in the illustrated example, and then with the ring 113 is turned to the angular position which gives automatic operation the lock means 118 will operate automatically to lock the ring 105 against turning movement.

The ring 109 is formed not only with the cutout which has the camming edge 110 for controlling the exposure time during manual setting thereof, but also this ring 109 is formed with a cutout having a camming edge 123 which is engaged by an unillustrated control pin of an exposure time controlling mechanism which provides a range of exposure times larger or longer than those exposure times provided by cooperation of the camming edge 110 with the pin 94. The pin and retarding mechanism which cooperate with the camming edge 123 are not illustrated. In addition, the plate or ring 109 is formed with an arcuate slot 124 extending along an arc of a circle whose center is in the optical axis and receiving a pin 125 of a lever 126 which comes into play during the B-setting where the operator will himself measure the exposure time. For this purpose the slot 124 is provided along one edge with a notch 127 which receives the pin 125 when the symbol "B" of the ring 113 is aligned with the index 115.

The camming edge 110 has an active portion 110a which will change the exposure time during movement of this active portion 110a with respect to the exposure time control means at the pin 94 thereof, and when the pin 94 is engaged by the camming edge portion 110b, which extends along an arc of a circle whose center is in the optical axis, there will be no change in the exposure time, this camming edge portion 110b being the inactive part of the camming edge 110. The camming edge 123 has an active portion 123a which produces changes in exposure time during movement with respect to the pin of the exposure time control means, and at both ends of the active portion 123a the camming edge 123 has portions 123b and 123c which are inactive in that they produce no further changes in exposure time and which are of different lengths. The exposure time setting structure is so arranged that when the camera is set for automatic operation with the symbol "A" of the ring 113 aligned with the index 115, the pin 94 is located at the end 110c of the camming edge 110. At this time the pin of the exposure time control means which cooperates with the camming edge 123 which provides longer exposure times is located in the region 123b of the camming edge 123, and at this time the pin 125 is located at the end 124a of the slot 124. In this position of the parts the retarding mechanism for the relatively long exposure times is incapable of operating and the lever 126 is also in an inoperative position, and the pin 94 is located by the edge portion 110b at a position providing the longest possible exposure time obtainable from the camming edge 110, this exposure time being, for example, 1/60 sec.

If the ring 113 is turned from the position shown in FIG. 4 in the direction of the arrow e to the position for flash operation whose symbol is directed directly next to the symbol "A," then the lock means 116, 120, 118 is released so as to release the ring 105, but the exposure time setting remains unchanged. Thus, the operator can at this time turn the ring 105 so as to set a desired exposure aperture into the camera, and the ring 105 at this time is turned in the direction of the arrow d. This will result in movement of the camming slots 100 of the blades 99 along the stationary pins 101, and since at this time the active portions 100a of the slots 100 receive the pins 100, respectively, the diaphragm blades 99 of course turn about the pivots 98 (which turn about the optical axis together with the ring 96) so that the exposure aperture is reduced in this way.

When the operator turns the ring 113 so as to locate the symbol "B" in alignment with the index 115, the inactive portions 110b and 123b of the camming edges 110 and 123, respectively, will still be in engagement with the pins of the exposure time controlling mechanisms so that there will be no change in the settings of these exposure time controlling mechanisms, but at this time the pin 125 will be received in the notch 127, as mentioned above. If the operator now operates the shutter release so as to make an exposure, the lever 126 is free to turn through an angular distance sufficient to locate the pin 125 in the notch 127 and in this way the shutter will be maintained open as long as the operator maintains the shutter release plunger or button depressed, so that the shutter is prevented from closing as long as the operator manually depresses the shutter release element of the camera.

Turning of the ring 113 further in the direction of the arrow e will locate the notch 127 beyond the pin 125, and at this time the inactive portion 110b of the camming edge 110 will still remain in engagement with the pin 94 so that further adjustment of the exposure time control means for relatively short exposure times does not take place. On the other hand, the pin which engages the camming edge 123 is now in contact with the active camming portion 123a thereof, so that the relatively long exposure times are set in this way during the alignment of the initial graduations of the exposure time scale with the index 115. At this time the greatest retarding in the operation of the shutter will be provided so as to provide the relatively long exposure times. The structure which cooperates with the camming edge 123 may provide exposure times down to 1/30 sec., for example. If the ring 113 is turned to provide an exposure time of 1/60 sec., then the pin which cooperates with the camming edge 123 reaches the inactive portion 123c thereof so that the exposure time controlling mechanism which cooperates with the camming edge 123 now becomes inoperative, but at this time the camming edge portion 110a of the camming edge 110 engages the pin 94 so as to provide the relatively short exposure times. The continued turning of the ring 113 beyond this point will of course move the active camming edge portion 110a with respect to the pin 94 so as to move the latter and provide progressively shorter exposure times down to the smallest possible exposure time. Of course, these latter settings take place during semi-automatic operation of the camera.

Of course, as long as the camera is operated as a semi-automatic camera the camming grooves at the inner surfaces of the rings 113 and 105 will actuate the differential means so as to enable the operator to bring the reference member and the pointer of the meter into alignment with each other. When the ring 113 is returned to the position for automatic operation so as to operate the camera automatically, then the structure described above in connection with FIG. 1 is actuated so as to release the scanning means which in the manner described above turns the transmission lever 25 in a direction opposite to that indicated by the arrow a, and in this way the pin 90 is turned so as to turn the ring 91. The slot 93 of course turns with the ring 91, and because the end 93a of the slot 93 engages the pin 95 the ring 96 also turns and moves the active slot portions 100a of the blades 99 along the pins 101 so that during the initial turning of the ring 91 it is the exposure aperture which is constantly reduced with the embodiment of FIG. 4. When the diaphragm means has reached the size providing the smallest exposure aperture, the pin 94 is engaged no longer by the inactive portion 92b of the camming edge 92 and instead is engaged by the active portion 92a of the edge 92 so that at this time the exposure time will be reduced. The ring 96 will continue to turn, but the inactive portions 100b of the slots 100 reach the pins 101, respectively, simultaneously with the engagement of the edge portion 92a with the pin 94, so that at this time the diaphragm remains at its smallest size while the exposure time is constantly reduced. Thus, with the embodiment of FIG. 4 the exposure time will be reduced from a maximum exposure time of 1/60 sec. while the exposure aperture remains at its minimum size.

Figure 6:
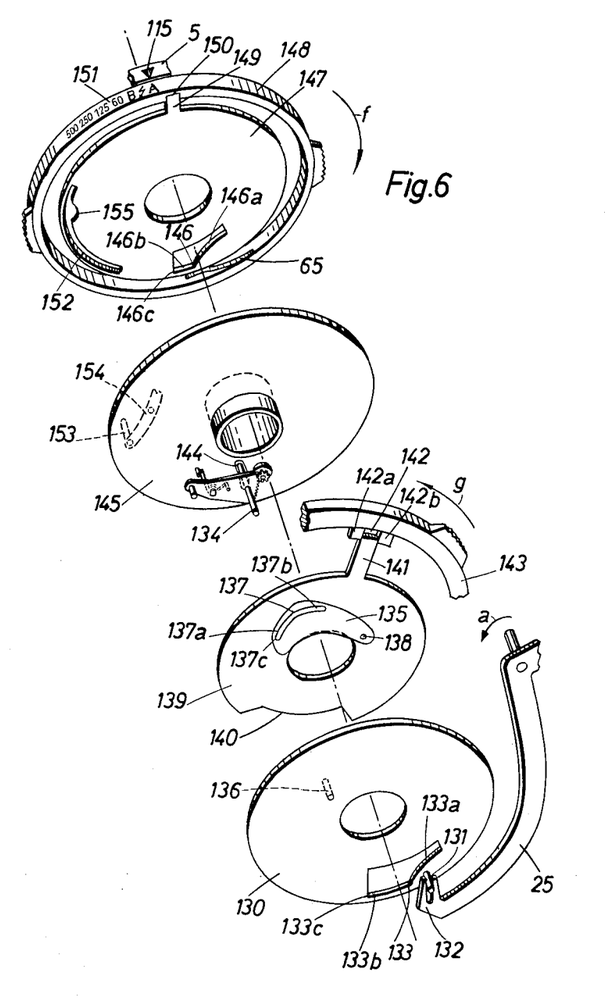
FIG. 6 is a fragmentary exploded perspective illustration of a third embodiment of elements arranged along the optical axis for providing semi-automatic or fully automatic operation.

Referring now to FIG. 6, with this embodiment also the meter and pointer means as well as the differential means, the scanning means, and the transmission means all referred to above are identical with those described in connection with FIG. 1. With the embodiment of FIG. 6 the transmission lever 25 cooperates with a ring 130 supported for rotary movement by the optical axis, this ring 130 fixedly carrying the pin 131 which is received in the bifurcated portion 132 of the lever 25. The ring 130 of the automatic means of the embodiment of FIG. 6 is formed with a cutout provided with a camming edge 133 which serves to automatically set the exposure time, and this camming edge 133 has an active portion 133a and an inactive portion 133b which of course extends along an arc of a circle whose center is in the optical axis. The camming edge 133 cooperates with the pin 134 of an exposure time control means of conventional construction. The ring 130 of the automatic means also carries a plurality of pins 136 only one of which is shown for the sake of clarity, and these pins 136 are respectively received in the camming slots 137 which are respectively formed in the diaphragm blades 135 only one of which is shown for the sake of clarity. The camming slots 137 of the blades 135 each have an active portion 137a and an inactive portion 137b. The several blades 135 are respectively supported on pivot pins 138 which are fixedly carried by a rotary ring 139 which is adapted to be manually turned by manual turning of the ring 143 which together with the ring 139 forms the manually operable diaphragm setting means. The ring 143 of course corresponds to the ring 44 described above. The ring 139 is formed at its periphery with a notch 140 through which the pin 134 freely extends into the cutout provided with camming edge 133, so that there is no interference between the diaphragm structure and the exposure time setting structure, and the connection between the manually turnable rings 139 and 143 is by way of a radial projection 141 of the ring 139 which is received in the space 142 between a pair of inwardly directed radial projections 142a and 142b of the ring 143. This ring 143 cooperates with an unillustrated scale of exposure apertures.

The pin 134 passes through an arcuate slot 144 which is formed in a stationary plane 145 which carries in addition to the exposure time setting structure the remaining elements of the shutter, and after passing through the slot 144 the pin 134 is received in a cutout of a plate 147, this cutout being provided with the camming edge 146 which also serves to set the exposure time. This ring 147 which is also supported for turning movement about the optical axis has at the camming edge 146 an active portion 146a and an inactive portion 146b. The ring 147 has radial projection 149 received in a recess 150 formed in the manually turnable ring 148. This ring 148 is of course formed with a camming groove 165 which actuates the differential means as described above, and the ring 143 is provided with a camming groove in the same way as the ring 44 described above so as to also actuate the differential means in order to bring the pointer means of the meter and the reference member into alignment with each other. The ring 148 carries at its outer periphery a scale 151 of exposure times as well as settings for automatic operation, flash operation, and a B-setting. This scale 151 cooperates with a stationary index 115 carried by the outer stationary tube 5.

It will be noted that the ring 147 is formed also with an arcuate slot 152 having at one edge a notch 155 which cooperates with the pin 153 of the lever 154 of the structure which in the B-setting of the ring 148 enables the operator to determine the exposure time manually.

The length of the inactive portion 133b of the camming edge 133 is equal to the angular distance through which the ring 130 is turned during movement of the diaphragm between its end positions. Also, the length of the inactive portion 137b of each slot 137 is equal to the angular distance required for turning the diaphragm between its end positions. The length of the inactive portion 146b of the camming edge 146 equals the angular distance through which the ring 48 and with it the ring 47 is turned during movement from the automatic setting to the setting which provides the longest exposure time by manual setting of the ring 148, this latter setting being 1/60 sec. in the illustrated example. The slot 152 has a structure substantially identical with the slot 124 of FIG. 4.

When making an automatic exposure with the embodiment of FIG. 6 the transmission lever 25 is of course again turned upon release of the scanning means to an angular distance which is determined by the lighting conditions, and this turning of the lever 25 takes place in a direction opposite to that indicated by the arrow a. During this turning of the lever 25 the ring 30 of course turns in a clockwise direction, as viewed in FIG. 6, and the inactive edge portion 133b moves with respect to the pin 134 which at the start of the operation is located at the end 133c of the edge portion 133b. Therefore during the initial turning of the ring 130 the exposure time remains unchanged. On the other hand the several pins 136 move along the active portions 137a of the slots 137 during the initial part of the turning of the ring 30 when the camera operates automatically, and as a result several blades 135 turn about the pivots 138 which remain stationary at this time with the ring 139, so that during the initial part of the turning of the ring 130 the diaphragm becomes gradually closed to provide progressively smaller exposure apertures.

When the diaphragm reaches its end position providing the smallest exposure aperture the active edge portion 133a of the camming edge 133 reaches the pin 134 and simultaneously the several pins 136 reach the inactive portions 137b of the several slots 137. Thus, during continued turning of the ring 130 the diaphragm remains unchanged at its smallest size and the active edge 133a acts on the pin 134 so as to constantly reduce the exposure time.

After the camera has thus been automatically set in this way and after the shutter has been released so as to make an exposure, the operator will release the key 29 described above in connection with FIGS. 1 and 3, and the parts will return to their starting position shown in FIG. 6.

In order to operate the camera in a semi-automatic manner where the exposure time and/or the exposure aperture are set manually, the ring 148 is turned by the operator in the direction of the arrow f, and this will advance the scale of exposure times toward the index 115. When the symbol "A" moves beyond the index 115, the symbol for flash operation becomes into alignment with the index 115. At this time, which is to say when the ring 148 has been turned to set the camera for flash operation the inactive portion 146b of the camming edge 146 will still be in engagement with the pin 134 so that the exposure time will remain unchanged at its initial value of 1/60 sec. On the other hand, the operator can at this time turn the ring 143 so as to set the exposure aperture, thus turning taking place in the direction of the arrow g. At this time the ring 130 and the pins 136 remain stationary so that the ring 139 turns with the ring 143 to move the several slots 137 along the pins 136 and the engagement of the active portions 137a of the slots 37 with the pins 136 will change the size of the exposure aperture. Further turning of the ring 148 in the direction of the arrow f will locate the symbol "B" in alignment with index 115, and in this B-setting of the camera the ring 147 has been turned through an angular distance which aligns the notch 115 with the pin 153 so that when the shutter is released the lever 154 can turn in order to prevent return of the shutter to its closed position until the operator releases the shutter operating button or plunger. At this time the pin 134 is still engaged by the inactive portion 146b of the camming edge 146.

The pin 134 is still engaged by the inactive portion 146b when the ring 148 is turned so as to align the exposure time graduation 60 with the index 115 so as to provide an exposure time 1/60 sec. This movement will only displace the notch 155 beyond the pin 153 so that the normal shutter operation will take place. It is only during subsequent turning of the ring 148 to align shorter exposure time graduations of the scale 151 with the index 115 that the active camming edge portion 146a engages the pin 134 so as to set the exposure time control means to provide exposure time shorter than 1/60 sec. When the ring 148 is in the angular position providing exposure times which are manually selected by the operator as well as when the ring 143 is turned to provide a manually selected exposure aperture the camming grooves at the inner periphery of the rings 148 and 143 will actuate the above-described differential means so as to turn the reference member so that it may be aligned with the pointer means which is turned by the meter, as described above.

With the embodiment of FIG. 6 it is possible to provide, as in the embodiment of FIG. 4, a lock means which will releasably lock the ring 143 against turning movement when the ring 148 is in the position providing automatic operation.

It will be noted that in all embodiments the manually turnable exposure time setting ring turns a ring provided with a camming edge to set the exposure time manually while a separate ring is provided with a camming edge to set the exposure time automatically. In the embodiment of FIG. 3 this separate ring 35 is connected with the ring 32 which is turned by the lever 24. However, in the embodiment of FIGS. 4 and 6 the rings 91 and 30 which are directly turned by the lever 25 are also formed with the camming edges which control the exposure time during automatic operation. Moreover, while in FIG. 2 the pair of rings 40 and 42 are required to set the diaphragm automatically and a third ring 53 will set the diaphragm manually, in FIG. 4 the same ring 96 is turned during manual or automatic setting of the diaphragm so that with this embodiment an exceedingly compact structure requiring a small number of elements is provided. The same is true of FIG. 6 where, although a pair of diaphragm adjusting rings are provided, it will be noted that the ring 130 serves not only to set the diaphragm during automatic operation of the camera but in addition sets the exposure time and serves as part of the transmission of the lever 25.

The invention is of course not limited to the above-described specific examples. For example, the above-described differential means and transmission means can be differently constructed. Moreover, instead of providing a movable reference member such as the pointer 16 of FIG. 1, it is possible to provide a stationary index and to arrange the entire meter for turning movement so that the differential means will turn the meter and its pointer into alignment with a stationary index which in this case forms the reference member with which the pointer of the meter is brought into alignment during semi-automatic operation. Moreover, instead of setting into the camera the factors of film speed and/or filter arrangement by means of setting the angular position of the meter 7, it is possible instead to provide, for example, a movable light shade member which can be moved into overlapping relation with the window through which light reaches the photoelectric cell or the photosensitive resistor so as to influence the amount of light reaching this light-sensitive element and therefore set the factor on the film speed and/or filter arrangement into the camera in this way.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adapatations should and are intended to be comprehended within the meaning and range of equivalence of the following claims.

What is claimed as new and desired to be secured by Letters Patent is:

1. In a camera, in combination, exposure time control means; diaphragm means; manually operable exposure time setting means cooperating with said exposure time control means for manually setting the latter; manually operable diaphragm setting means cooperating with said diaphragm means for manually setting the latter; automatic means cooperating with said exposure time control means and with said diaphragm means for automatically setting said exposure time control means and said diaphragm means, both of said manually operable means remaining stationary during operation of said automatic means and said automatic means remaining stationary during operation of either one of said manually operable means by the operator; meter means having a pointer whose position is indicative of the lighting conditions, said automatic means cooperating with said meter means to have its operation controlled by said meter means so that said automatic means sets the camera in accordance with the lighting conditions; a reference member; and differential means actuated by both of said manually operable means and cooperating with said reference member for bringing said pointer and reference member into alignment with each other during operation by the operator of either one of or both of said manually operable means so that said meter means assists the operator in the manual setting of the camera also.

2. In a camera, in combination, exposure time control means; diaphragm means; manually operable exposure time setting means cooperating with said exposure time control means for manually setting the latter; manually operable diaphragm setting means cooperating with said diaphragm means for setting the latter; automatic means cooperating with said exposure time control means and with said diaphragm means for automatically setting said exposure time control means and said diaphragm means; pointer means; a meter cooperating with said pointer means for placing the latter in positions indicative of the lighting conditions; manually releasable scanning means cooperating, when manually released, with said pointer means for moving to a position determined by the position of said pointer means, so that the position of said scanning means is also indicative of the lighting conditions; transmission means actuated by said scanning means and cooperating with said automatic means for transmitting movement of said scanning means to said automatic means to move the latter automatically for automatically setting said exposure time control means and said diaphragm means; a reference member; and differential means actuated by either one or both of said manually operable means and cooperating with said reference member for bringing the latter into alignment with said pointer means so that said meter and pointer means contribute to the manual as well as the automatic setting of the camera.

3. In a camera, in combination, exposure time control means; diaphragm means; manually operable exposure time setting means cooperating with said exposure time control means for manually setting the latter; manually operable diaphragm setting means cooperating with said diaphragm means for setting the latter; automatic means cooperating with said exposure time control means and with said diaphragm means for automatically setting said exposure time control means and said diaphragm means; pointer means; a meter cooperating with said pointer means for placing the latter in positions indicative of the lighting conditions; manually releasable scanning means cooperating, when manually released, with said pointer means for moving to a position determined by the position of said pointer means, so that the position of said scanning means is also indicative of the lighting conditions; transmission means actuated by said scanning means and cooperating with said automatic means for transmitting movement of said scanning means to said automatic means to move the latter automatically for automatically setting said exposure time control means and said diaphragm means; a reference member; differential means actuated by either one or both of said manually operable means and cooperating with said reference member for bringing the latter into alignment with said pointer means so that said meter and pointer means contribute to the manual as well as the automatic setting of the camera; and additional manually operable means cooperating with said meter and pointer means for influencing the same according to a further factor which determines the exposure of film in the camera.

4. In a camera as recited in claim 3, said further factor being the film speed.

5. In a camera as recited in claim 3, said further factor being the filter arrangement which is used with the camera.

6. In a camera as recited in claim 3, said further factor being a combination of the film speed and the filter arrangement.

7. In a camera, in combination, exposure time control means; diaphragm means; manually operable exposure time setting means cooperating with said exposure time control means for manually setting the latter; manually operable diaphragm setting means cooperating with said diaphragm means for manually setting the latter; automatic means cooperating with said exposure time control means and with said diaphragm means for automatically setting said exposure time control means and said diaphragm means; a meter responsive to lighting conditions; support means supporting said meter for movement in its entirety; pointer means moved by said meter to positions indicative of the lighting conditions; manually releasable scanning means cooperating with said pointer means for automatically moving, when released by the operator, to a position determined by said pointer means and therefore also indicative of the lighting conditions; transmission means actuated by said scanning means and cooperating with said automatic means for transmitting movement of said scanning means to said automatic means to operate the latter automatically for setting the exposure time and diaphragm of the camera; a reference member; differential means actuated by both of said manually operable means for bringing said reference member into alignment with said pointer means so that said meter and pointer means contribute to the setting of the camera when the latter is set manually as well as when the camera is set automatically; and additional manually operable means cooperating with said meter for moving the latter in its entirety with respect to said support means for setting into the camera an exposure determining factor in addition to the exposure time and exposure aperture.

8. In a camera, in combination, exposure time setting means; diaphragm means including a pair of rings at least one of which is turnable with respect to the other for setting said diaphragm means; manually operable exposure time setting means cooperating with said exposure time control means for manually setting the latter; manually operable diaphragm setting means cooperating with one of said rings for turning the same to set the diaphragm; automatic means cooperating with said exposure time control means for automatically setting the latter and cooperating with one of said rings of said diaphragm means for turning the latter ring for setting said diaphragm means automatically; pointer means; a meter cooperating with said pointer means for moving the latter to positions indicative of the lighting conditions; manually releasable scanning means cooperating with said pointer means for moving, when released by the operator, to positions determined by said pointer means so that said scanning means will move also to a position indicative of the lighting conditions; transmission means actuated by said scanning means and cooperating with said automatic means for automatically moving the latter to set the camera automatically; a reference member; and differential means actuated by both of said manually operable means and cooperating with said reference member for bringing said pointer means and reference member into alignment with each other during operation of either one or both of said manually operable means.

9. In a camera, in combination, exposure time control means; diaphragm means including a pair of rings each of which is turnable with respect to the other for setting said diaphragm means; manually operable means cooperating with said exposure time control means for manually setting the latter; manually operable diaphragm setting means cooperating with one of said rings for turning said one ring to set the diaphragm manually; automatic means cooperating with said exposure time control means for automatically setting the latter and cooperating with the other one of said rings for turning said other ring to set the diaphragm means automatically; a meter responsive to lighting conditions; pointer means moved by said meter to positions indicative of the lighting conditions; manually releasable scanning means movable when released by the operator to positions determined by said pointer means so that said scanning means also is indicative of lighting conditions; transmission means transmitting movement of said scanning means to said automatic means for actuating the latter to set the camera automatically; a reference member; and differential means actuated by both of said manually operable means and cooperating with said reference member for bringing said pointer means and reference member into alignment with each other when the camera is manually set.

10. In a camera, in combination, exposure time control means; diaphragm means having a single rotary ring which is turnable for setting said diaphragm means; spring means cooperating with said single ring for yieldably maintaining the latter in a rest position where said diaphragm means provides the largest exposure aperture; manually operable exposure time setting means with said exposure time control means for manually setting the latter; manually operable diaphragm setting means cooperating with said ring for manually turning the latter to set said diaphragm means manually; automatic means cooperating with said exposure time control means for automatically setting the latter and with said ring for turning the latter to set said diaphragm means automatically; a meter responsive to lighting conditions; pointer means moved by said meter to positions indicative of the lighting conditions; scanning means for scanning the position of said pointer means; transmission means transmitting movement of said scnaning means to said automatic means for actuating the latter to set the camera automatically; a reference member; and differential means actuated by both of said manually operable means and cooperating with said reference member for bringing said pointer means and reference member into alignment with each other during manual setting of the camera.

11. In a camera, in combination, exposure time control means; diaphragm means; manually operable exposure time setting means cooperating with said exposure time control means for manually setting the latter and including a first ring turnable by the operator and having a camming edge which actuates said exposure time control means; and automatic means cooperating with said exposure time control means for automatically setting the latter and with said diaphragm means for automatically setting the latter also, said automtaic means including a single ring which forms part of said diaphragm means and sets the latter during turning of said single ring and which also is formed with a second camming edge which cooperates with said exposure time control means to set the latter so that said single ring of said automatic means forms a second ring for controlling the exposure time.

12. In a camera, in combination, exposure time control means; diaphragm means; manually operable exposure time setting means cooperating with said exposure time control means for manually setting the latter; manually operable diaphragm setting means cooperating with said diaphragm means for manually setting the latter; and automatic means cooperating with said exposure time control means for automatically setting the latter and with said diaphragm means for automatically setting the latter, the assembly of all of said means including a pair of camming edges one of which controls the setting of said exposure time control means and the other of which controls the setting of said diaphragm means, and each of said camming edges having an active portion which changes a setting and an inactive portion which has no influence on a setting.

13. In a camera, in combination, exposure time control means; diaphragm means; manually operable exposure time setting means cooperating with said exposure time control means for manually setting the latter; manually operable diaphragm setting means cooperating with said diaphragm means for setting the latter; automatic means cooperating with said exposure time control means for automatically setting the latter and with said diaphragm means for automatically setting the latter, said manually operable exposure time setting means also setting the camera for manual or automatic operation; and releasable lock means actuated by said manually operable exposure time setting means for releasably locking said manually operable diaphragm setting means against manual operation when said manually operable exposure time setting means sets the camera for automatic operation.

14. In a camera as recited in claim 13, said manually operable exposure time setting means and said manually operable diaphragm setting means respectively including a pair of coaxial manually turnable rings respectively having flanges directed toward each other and respectively formed at said flanges with notches which respectively form parts of said lock means, said lock means further including a lever between said flanges and turnable at end portions respectively into said notches, only said notch of said flange of said ring of said manually operable exposure time setting means having an inclined edge which engages said lever during turning of said manually operable exposure time setting ring for turning said lever out of the notch of said ring of said manually operable diaphragm setting means as well as for displacing said lever from said notch of said ring of said manually operable exposure time setting means, and said lock means including a spring urging said lever to turn in a direction which urges end portions of said lever respectively into said notch notches when the latter are aligned with said end portions of said lever.

15. In a camera, in combination, exposure time control means; diaphragm means; manually operable means cooperating with said exposure time control means for automatically setting the latter; manually operable diaphragm setting means cooperating with said diaphragm means for automatically setting the latter; automatic means cooperating with said exposure time control means and with said diaphragm means for automatically setting said exposure time control means and said diaphragm means, said manually operable exposure time setting means also setting the camera either for manual or automatic operation; and motion transmitting means carried by said manually operable exposure time setting means and cooperating with said manually operable diaphragm setting means for moving the latter to a predetermined position when said manually operable exposure time setting means is moved to a position setting the camera for automatic operation.

16. In a camera, in combination, exposure time control means; diaphragm means; manually operable exposure time setting means cooperating with said exposure time control means for manually setting the latter to provide a predetermined exposure time, said manually operable exposure time setting means also cooperating with said exposure time control means to set the latter for an exposure determined manually by the operator; manually operable diaphragm setting means cooperating with said diaphragm means for manually setting the latter; automatic means cooperating with said exposure time control means and with said diaphragm means for automatically setting the exposure time and exposure aperture of the camera; a meter responsive to lighting conditions; pointer means moved by said meter to a position indicative of the lighting conditions; scanning means releasable by the operator for scanning the position of said pointer means so that said scanning means assumes a position also indicative of the lighting conditions; transmission means transmitting movement of said scanning means to said automatic means for actuating the latter to automatically set the camera; a reference member; and differential means actuated by both of said manually operable means and cooperating with said reference member for bringing said pointer means and reference member into alignment with each other.

17. In a camera, in combination, exposure time control means operable through a given range of exposure times; diaphragm means; manually operable exposure time setting means cooperating with said exposure time control means for manually setting the latter throughout said range; manually operable diaphragm setting means cooperating with said diaphragm means for manually setting the latter; and automatic means cooperating with said exposure time control means and with said diaphragm means for automatically setting said exposure time control means and said diaphragm means, said automatic means including a camming edge cooperating with said exposure time control means for setting the latter for relatively short exposure times and said manually operable exposure time setting means including a camming edge cooperating with said exposure time control means for setting the latter for said relatively short exposure times as well as exposure times substantially longer than those provided by said automatic means.

References Cited in the file of this patent
UNITED STATES PATENTS

| | | |
|---|---|---|
| 2,913,969 | Faulhaber | Nov. 24, 1959 |
| 2,923,216 | Greger | Feb. 2, 1960 |
| 2,969,004 | Gebele | Jan. 24, 1961 |